UNITED STATES PATENT OFFICE.

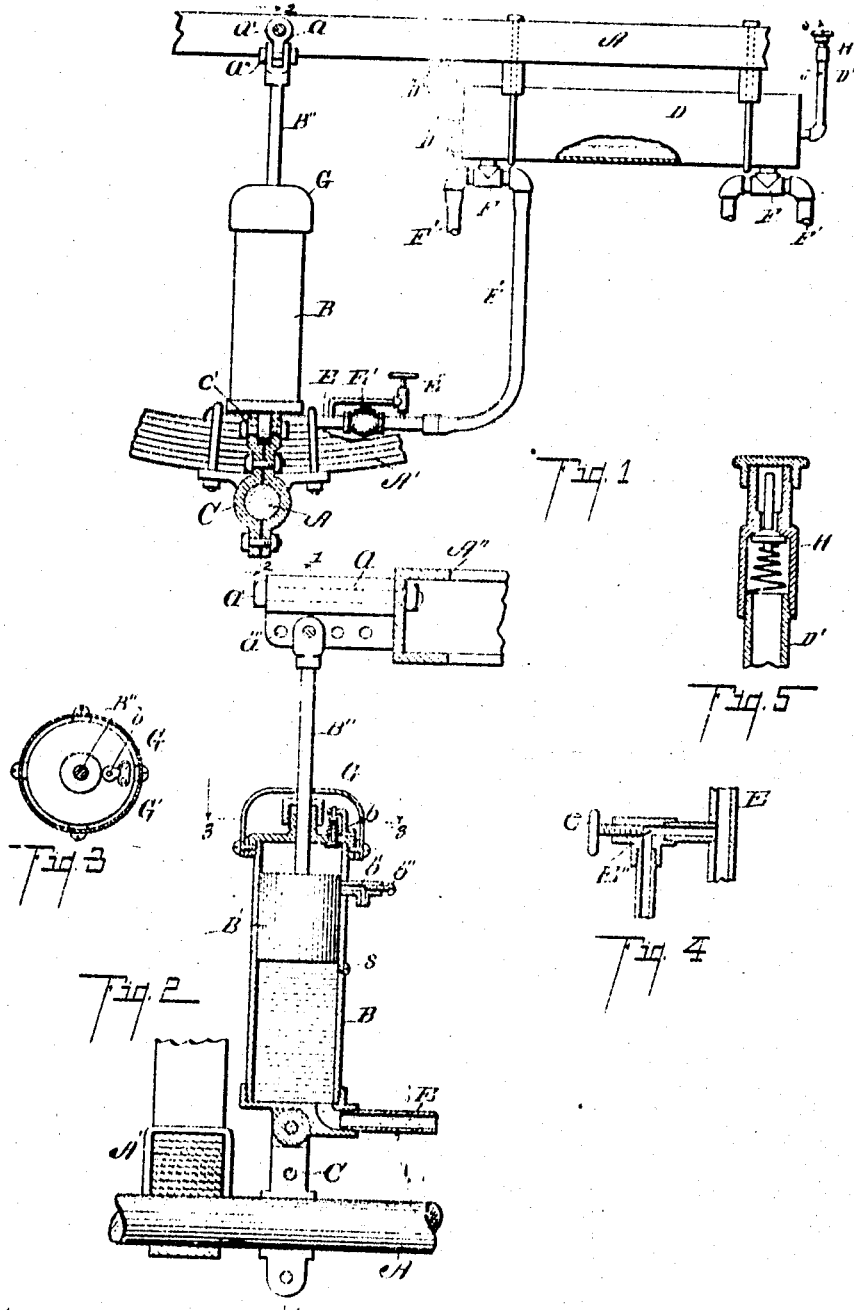

IRVING COWLES AND ERNEST H. MacDOWELL, OF SOUTH HAVEN, MICHIGAN.

PNEUMATIC SPRING DEVICE.

1,002,821.  Specification of Letters Patent.  Patented Sept. 12, 1911.

Application filed April 13, 1906. Serial No. 311,532.

*To all whom it may concern:*

Be it known that we, IRVING COWLES and ERNEST H. MacDOWELL, citizens of the United States, residing at South Haven, in the county of Van Buren, State of Michigan, have invented certain new and useful Improvements in Pneumatic Spring Devices, of which the following is a specification.

This invention relates to improvements in spring or cushion devices.

In vehicles, particularly motor vehicles, it is very desirable to have a spring construction which is capable of sustaining very heavy loads and at the same time one which is very elastic.

Our spring device is especially designed for use on motor vehicles, although it is desirable for use in numerous other relations, such as carriages, wagons, cars, and the like.

The objects of this invention are: First, to provide an improved spring device which is very elastic and at the same time capable of carrying very heavy loads. Second, to provide an improved spring device in which the recoil or return is easy and gradual. Third, to provide an improved spring device which may be quickly adjusted to the load it is to carry. Fourth, to provide an improved spring device embodying the above advantages which is very simple and economical in structure.

Further objects, and objects relating to structural details will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawing forming a part of this specification, in which—

Figure 1 is a detail view of a structure embodying the features of our invention, partially in section, on line 1—1 of Fig. 2. Fig. 2 is a detail vertical section on line 2—2 of Fig. 1. Fig. 3 is a horizontal section on line 3—3 of Fig. 2. Fig. 4 is an enlarged detail section showing the arrangement of the bypass E″ for the valve E′. Fig. 5 is an enlarged detail section on a line corresponding to line 5—5 of Fig. 1.

In the drawing the sectional views are taken looking in the direction of the little arrows at the ends of the section lines, and similar letters of reference refer to similar parts throughout the several views.

Referring to the drawing, A represents the axle of a vehicle, and A′ a spring, a semielliptical spring being illustrated.

A″ represets a vehicle body.

The cylinder B is secured to the axle A by the clip C. The cylinder is connected to this clip by the pivot bolt c′, which is arranged transversely of the axle, through a downwardly projecting ear on the cylinder.

Within the cylinder is a plunger B′ which is connected by the plunger rod B″ to the vehicle body. The plunger rod B″ is pivotally connected by a bolt a″, thus forming a universal joint connection for the plunger rod to the vehicle body. The coupling member a is preferably provided with a series of holes a‴ for the bolt a″ so that considerable latitude of adjustment is provided.

The tank D is secured to the under side of the vehicle body by suitable hangers. This tank is connected to the lower end of the cylinder B by means of the pipe E and the flexible pipe F′. In practice we provide a pair of the cylinders for each axle. They are all preferably connected to the tank D as is indicated in Fig. 1, there being a T-shaped coupling F at each end of the tank to which the flexible tubes F′ are connected.

In the pipe E is a check valve E′ which allows the fluid to pass freely from the cylinder but checks its return. This valve is provided with a bypass E″. (See Figs. 1 and 4.) This bypass allows the fluid to return slowly to the cylinder after being forced therefrom. A needle valve, as e, is provided for this bypass.

The tank D is preferably partially filled with oil or other liquid, the liquid also filling the cylinder below the piston and the pipe connections for the piston to the tank D. The tank D is adapted to contain air under pressure, and serves as a compression chamber for the cylinder, and we preferably provide the same with a pressure gage D‴ and a liquid gage D″. (See Fig. 1.)

The tank D is preferably provided with a filling pipe D′ which projects upwardly through the floor of the vehicle body, the body not here illustrated. A suitable pneumatic valve, as H, is provided for the pipe D′.

In the inner end of the cylinder B is an inwardly opening air inlet valve $b$. This valve is a check valve, and is held normally in its seat by a suitable spring. When the plunger is forced downward the suction caused thereby opens the valve and allows the air to flow through the same. In the cylinder, toward its inner end, is an air exhaust port $b'$, which allows the escape of the air on the return or upward movement of the plunger. A valve $b''$ is provided for regulating the size of the escape port, thereby controlling the return of the plunger.

To protect the valve $b$ and the upper end of the cylinder B from dirt, we provide a cap G which is perforated to receive the plunger and is secured to the cylinder by suitable set screws.

In operation, the tank D is filled with air under pressure, sufficient preferably to raise the body of the vehicle slightly above its normal position when not carrying a load. When the vehicle is loaded, the load is in effect supported on an air cushion. In case of a blow being delivered to the axle, as by the engagement of the wheel carried thereby with an obstruction in the road, the plunger B' is given a relatively downward movement in the cylinder in opposition to the pressure of the fluid contained therein. The capacity of the cylinder is small, relative to that of the chamber D, and consequently the pressure in the system is only slightly increased by the movements of the plungers to their lowermost positions. On this downward movement of the cylinder, air flows into the cylinder behind the plunger through the valve $b$. On the return of the plunger the air escapes through the exhaust $b'$, which allows the air to escape slowly, thereby preventing the quick return of the plunger. The inner part of the cylinder above the exhaust forms an air cushion, so that the return movement is gradually checked, thereby preventing the disagreeable throw incident to springs of ordinary construction, the shock of the return being entirely absorbed in the spring device.

We preferably use our spring gear in conjunction with metal springs of the usual or any desired construction which serve to hold the body against swaying movement. Other means might, however, be employed. By connecting the four cylinders provided for each vehicle with a common air chamber, the vehicle body is evenly supported throughout.

Our improved spring device carries the vehicle body very evenly and at the same time has all of the advantages of very resilient springs. The return or recoil incident to such springs is overcome, so that where springs are used in connection with our device the danger of breaking is obviated and the objectionable throw effect eliminated.

In charging the device, the vents in the cylinders closed by the screw plugs, are opened to allow the escape of the air from the cylinders below the plungers.

We have illustrated and described our improvements in detail in the form preferred by us on account of structural economy and convenience in attaching to the vehicle. We are, however, aware that it is capable of very great structural variation without departing from our invention; and, while we have, as stated, particularly designed the same for use on motor vehicles, such as automobiles, it is desirable for use in a great many other relations.

Having thus described our invention, what we claim as new and desire to secure by Letters Patent, is—

1. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, and means interposed in said communication between said cylinder and reservoir for automatically varying the flow of liquid to and from the said cylinder respectively.

2. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, a check valve interposed in said communication to prevent the flow of liquid from said reservoir to said cylinder, and a by-pass for said check valve.

3. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, a check valve interposed in said communication to prevent the flow of liquid from said reservoir to said cylinder, a by-pass for said check valve, and a control valve for said by-pass.

4. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, means interposed in said communication between said cylinder and reservoir for automatically varying the flow of liquid to and from the said cylinder respectively, and means for trapping the compressible fluid against which said piston acts thereby providing a retarding medium for the movement of the piston in the first named direction.

5. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, a check valve interposed in said communication to prevent the flow of liquid from said reservoir to said cylinder, a by-pass for said check valve, and means for trapping the compressible fluid against which said piston acts thereby providing a retarding medium for the movement of the piston in the first named direction.

6. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, a check valve interposed in said communication to prevent the flow of liquid from said reservoir to said cylinder, a by-pass for said check valve, a control valve for said by-pass, and means for trapping the compressible fluid against which said piston acts thereby providing a retarding medium for the movement of the piston in the first named direction.

7. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, and means for trapping the compressible fluid against which said piston acts thereby providing a retarding medium for the movement of the piston in the first named direction.

8. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, said cylinder provided with an inlet port for the compressible fluid against which the piston acts, and a check valve for controlling said port thereby trapping said compressible fluid and providing a retarding medium for the movement of the piston in the first named direction.

9. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, and means for trapping the compressible fluid against which said piston acts thereby providing a retarding medium for the movement of the piston in the first named direction, said cylinder provided with means whereby the volume of compressible fluid trapped to constitute the retarding medium is controlled.

10. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, means for trapping the compressible fluid against which said piston acts thereby providing a retarding medium for the movement of the piston in the first named direction, and said cylinder provided with means controlled by the movement of the piston for regulating the volume of compressible fluid trapped to constitute the retarding medium.

11. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, said cylinder provided with an inlet port for the compressible fluid against which the piston acts, a check valve for controlling said port thereby trapping said compressible fluid and providing a retarding medium for the movement of the piston in the first named direction, and said cylinder provided with means controlled by the movement of the piston for regulating the volume of compressible fluid trapped to constitute the retarding medium.

12. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, means for trapping the compressible fluid against which said piston acts thereby providing a retarding medium for the movement of the piston in the first named direction, and said cylinder provided with an exhaust port controlled by the movement of the piston for regulating the volume of compressible fluid trapped to constitute the retarding medium.

13. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, a check valve interposed in said communication to prevent the flow of liquid from said reservoir to said cylinder, a by-pass, for said check valve, a check-valve controlled inlet port for the admission and trapping of compressible fluid to provide a retarding medium for the movement of the piston in the first named direction, and said cylinder provided with means controlled by the movement of the piston for regulating the volume of compressible fluid trapped to constitute the retarding medium.

14. In a cushioning device, a reservoir containing a liquid and a gaseous fluid under pressure, a sustaining device adapted to be interposed between two relatively movable bodies to support one above the other and including a cylinder communicating with said reservoir and containing a reciprocatory piston operating in one direction solely against a compressible fluid and in the other direction solely against the liquid supplied from said reservoir, said liquid constituting a vehicle for the transmission of the pressure of said gaseous fluid in said reservoir to said piston whereby the liquid will sustain the latter, a check valve interposed in said communication to prevent the flow of liquid from said reservoir to said cylinder, a by-pass for said check valve, a control valve for said by-pass, a check-valve controlled inlet port for the admission and trapping of compressible fluid to provide a